(12) United States Patent
Hayashi

(10) Patent No.: US 10,696,101 B2
(45) Date of Patent: Jun. 30, 2020

(54) PNEUMATIC TIRE

(71) Applicant: BRIDGESTONE CORPORATION, Chuo-ku, Tokyo (JP)

(72) Inventor: Shintaro Hayashi, Hachioji (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 384 days.

(21) Appl. No.: 15/502,608

(22) PCT Filed: Aug. 7, 2015

(86) PCT No.: PCT/JP2015/003979
§ 371 (c)(1),
(2) Date: Feb. 8, 2017

(87) PCT Pub. No.: WO2016/031154
PCT Pub. Date: Mar. 3, 2016

(65) Prior Publication Data
US 2017/0225515 A1    Aug. 10, 2017

(30) Foreign Application Priority Data
Aug. 29, 2014  (JP) .................................. 2014-176204

(51) Int. Cl.
*B60C 11/03* (2006.01)
*B60C 11/04* (2006.01)
(Continued)

(52) U.S. Cl.
CPC .............. *B60C 11/12* (2013.01); *B60C 11/01* (2013.01); *B60C 11/03* (2013.01);
(Continued)

(58) Field of Classification Search
CPC . B60C 11/12; B60C 11/0304; B60C 11/1236; B60C 11/1384; B60C 2011/0381
See application file for complete search history.

(56) References Cited

U.S. PATENT DOCUMENTS

D639,720 S  *  6/2011  Harvey ........................ D12/521
D708,116 S  *  7/2014  Caron .......................... D12/523
(Continued)

FOREIGN PATENT DOCUMENTS

CN    1720150 A    1/2006
CN  101687442 A    3/2010
(Continued)

OTHER PUBLICATIONS

Machine translation for Japan 06-191224 (Year: 2019).*
(Continued)

*Primary Examiner* — Steven D Maki
(74) *Attorney, Agent, or Firm* — Kenja IP Law PC

(57) ABSTRACT

This pneumatic tire includes, on the tread surface, land portions defined by circumferential main grooves extending continuously in the tread circumferential direction and by tread edges. An intermediate land portion on one side in the tread width direction, adjacent to the tire equatorial plane side of the outermost circumferential main groove on the one side, is formed into blocks only by sipes extending in the tread width direction, an intermediate land portion on the other side in the tread width direction, adjacent to a tire equatorial plane side of an outermost circumferential main groove on the other side, is formed in a ribbed shape, and intermediate land portion lug grooves are formed in the intermediate land portion on the other side, with one end opening into the outermost circumferential main groove on the other side, and the other end terminating within the intermediate land portion on the other side.

8 Claims, 1 Drawing Sheet

(51) Int. Cl.
*B60C 11/12* (2006.01)
*B60C 11/01* (2006.01)
*B60C 11/13* (2006.01)

(52) U.S. Cl.
CPC ...... *B60C 11/0302* (2013.01); *B60C 11/0304* (2013.01); *B60C 11/0306* (2013.01); *B60C 11/1236* (2013.01); *B60C 11/1384* (2013.01); *B60C 2011/0341* (2013.01); *B60C 2011/0381* (2013.01); *B60C 2011/0386* (2013.01)

(56) References Cited

U.S. PATENT DOCUMENTS

| | | | |
|---|---|---|---|
| D709,434 S * | 7/2014 | Kato | D12/521 |
| 2005/0183807 A1 | 8/2005 | Hildebrand et al. | |
| 2010/0108214 A1* | 5/2010 | Colombo | B60C 11/0306 152/209.9 |
| 2010/0206445 A1 | 8/2010 | Dobashi et al. | |
| 2013/0186532 A1 | 7/2013 | Kujime | |
| 2014/0305559 A1* | 10/2014 | Takemoto | B60C 11/0304 152/209.8 |
| 2015/0151584 A1 | 6/2015 | Koishikawa | |
| 2016/0193880 A1* | 7/2016 | Colombo | B60C 11/0304 152/209.9 |
| 2016/0297254 A1* | 10/2016 | Numata | B60C 11/0332 |

FOREIGN PATENT DOCUMENTS

| | | | |
|---|---|---|---|
| CN | 102232025 A | | 11/2011 |
| CN | 102463852 A | | 5/2012 |
| CN | 105377584 A | | 3/2016 |
| DE | 102009003565 A1 | | 9/2010 |
| JP | 05-178015 A | * | 7/1993 |
| JP | H05178015 A | | 7/1993 |
| JP | 06-191224 A | * | 7/1994 |
| JP | 2004-345457 A | * | 12/2004 |
| JP | 2005-075213 A | * | 3/2005 |
| JP | 2011-255685 A | * | 12/2011 |
| JP | 2012020671 A | | 2/2012 |
| JP | 2012236455 A | | 12/2012 |
| WO | WO-2007/028442 A1 | * | 3/2007 |
| WO | 2009060476 A1 | | 5/2009 |
| WO | 2014030476 A1 | | 2/2014 |
| WO | 2015008137 A1 | | 1/2015 |

OTHER PUBLICATIONS

Machine translation for Japan 05-178015 (Year: 2019).*
Machine translation for Japan 2011-255685 (Year: 2019).*
Machine transaltion for Japan 2005-075213 (Year: 2019).*
Machine translation for Japan 2004-345457 (Year: 2019).*
Machine translation for WO 2007/028442 (Year: 2019).*
May 29, 2018, Search Result of Office Action issued by the State Intellectual Property Office in the corresponding Chinese Patent Application No. 201580045760.7.

* cited by examiner

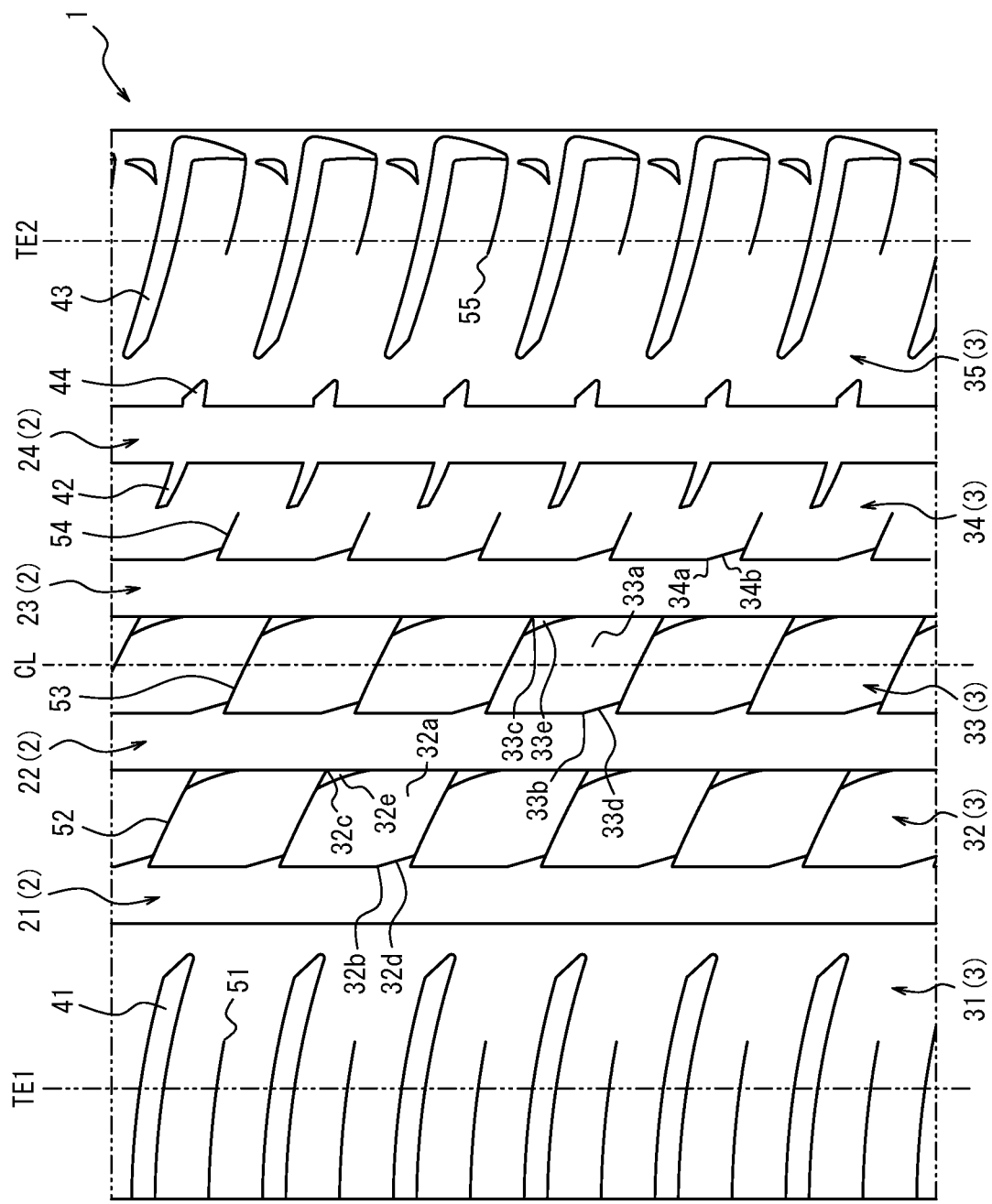

PNEUMATIC TIRE

TECHNICAL FIELD

This disclosure relates to a pneumatic tire.

BACKGROUND

Conventionally, in order to improve the steering stability of pneumatic tires, methods have been adopted such as providing a plurality of land portions defined on the tread surface with a ribbed shape, the land portions being defined by circumferential main grooves extending continuously in the tread circumferential direction and by the tread edges (for example, see JP 2012-236455 A (PTL 1)).

CITATION LIST

Patent Literature

PTL 1: JP 2012-236455 A

SUMMARY

Technical Problem

In the pneumatic tire disclosed in PTL 1, however, the rigidity of the land portions increases, which may reduce the quietness during ground contact and the ride comfort. Also, in the pneumatic tire of PTL 1, the land portions have a completely ribbed shape, without being divided in the tread width direction, and therefore may have insufficient drainage performance.

Therefore, it would be helpful to provide a pneumatic tire that improves the ride comfort, quietness, and drainage performance while maintaining the steering stability.

Solution to Problem

A summary of this disclosure is as follows.

A pneumatic tire according to one aspect of this disclosure includes: a tread surface; the tread surface having an inner side and an outer side wherein, in a tread width direction, the inner side of the tread surface is positioned towards a lateral center of a vehicle when the pneumatic tire is mounted to the vehicle and the outer side of the tread surface is positioned towards a lateral outside of the vehicle when the pneumatic tire is mounted to the vehicle; a plurality of circumferential main grooves extending continuously in the tread surface in a tread circumferential direction; a plurality of land portions defined by the circumferential main grooves; an inner side intermediate land portion on the inner side of the tread surface, the inner side intermediate land portion formed into blocks only by inner side intermediate sipes extending in the tread width direction and wherein the inner side intermediate land portion is between an innermost circumferential main groove on the tread surface and a tire equatorial plane; an outer side intermediate land portion on the outer side of the tread surface formed in a ribbed shape, wherein in the ribbed shape the outer side intermediate land portion is not divided into blocks in the tread circumferential direction by lug grooves or sipes; a central land portion extending across the tire equatorial plane, the central land portion positioned between the inner side intermediate land portion and the outer side intermediate land portion; outer side intermediate lug grooves formed in the outer side intermediate land portion, with outer ends of the outer side intermediate lug grooves opening into an outermost circumferential main groove and inner ends of the outer side intermediate lug grooves terminating within the outer side intermediate land portion; and outer side intermediate sipes formed on an inner side of the outer side intermediate land portion, with inner side ends of the outer side intermediate sipes opening into an outer side intermediate circumferential main groove, the outer side intermediate circumferential main groove positioned on an outer side of the tire equatorial plane, and wherein outer side ends of the outer side intermediate sipes terminate within the outer side intermediate land portion, the outer side intermediate sipes and the outer side intermediate lug grooves are alternately disposed in the tire circumferential direction, the outer side intermediate sipes are the only sipes in the outer side intermediate land portion, the central land portion is formed into blocks by central sipes wherein the central sipes extend in the tread width direction on extended lines of the inner side intermediate sipes.

Another aspect of this disclosure is a tire-rim assembly comprising the pneumatic tire as discussed above, wherein the inner side of the tread surface of the pneumatic tire is positioned at one side of the rim to be faced to a vehicle when the tire-rim assembly is mounted to the vehicle and the outer side of the tread surface of the pneumatic tire is positioned at the other side of the rim to be faced to a curb when the tire-rim assembly is mounted to the vehicle.

The "tread surface" refers to the entire outer circumferential surface of the tire that comes into contact with the road surface when the tire is attached to an applicable rim, filled to a prescribed internal pressure, and rolled while being placed under a load corresponding to the maximum load capability. As used herein, an "applicable rim" refers to a standard rim specified by the standards below in accordance with tire size ("Design Rim" in the YEAR BOOK of the below-mentioned TRA, and "Measuring Rim" in the STANDARDS MANUAL of the below-mentioned ETRTO), "prescribed internal pressure" refers to air pressure specified by the standards below in accordance with the maximum load capability, and the "maximum load capability" refers to the maximum mass that the tire is allowed to bear according to the standards below. The standards are determined by valid industrial standards for the region in which the tire is produced or used, such as the "YEAR BOOK" of the "Tire And Rim Association, Inc." (TRA) in the United States of America, the "STANDARDS MANUAL" of the "European Tyre and Rim Technical Organisation" (ETRTO) in Europe, and the "JATMA YEAR BOOK" of the "Japan Automobile Tyre Manufacturers Association" (JATMA) in Japan.

The "groove" refers to an opening with a width of greater than 1.5 mm that opens to the tread surface when the pneumatic tire is mounted on an applicable rim and filled to prescribed internal pressure, with no load applied. On the other hand, a "sipe" is a thin cut, inward from the surface of the land portion, such that the width of the opening to the tread surface is 1.5 mm or less, preferably 1 mm or less, and even more preferably 0.7 mm or less when the pneumatic tire is mounted on an applicable rim and filled to prescribed internal pressure, with no load applied.

"Extending in the tread width direction" does not refer to "extending in exactly the tread width direction" but refers to extending in a direction having a component in the tire width direction.

Stating that the circumferential main grooves "extend continuously in the tread circumferential direction" refers to extending continuously towards the tread circumferential direction and includes the cases of extending continuously towards the tread circumferential direction in a zigzag shape and of extending towards the tread circumferential direction while curving.

The "tread edge" refers to the outermost position in the tread width direction of the aforementioned "tread surface."

A "ribbed shape" refers to the land portion not being divided by grooves or sipes into blocks in the tread circumferential direction.

The statement below that one end of the lug grooves on the equatorial plane side "opens to the circumferential main groove at a position corresponding to an opening position of the intermediate land portion lug groove to the circumferential main groove" refers to the opening position of the intermediate land portion lug grooves and the opening position of the lug grooves on the equatorial plane side partially overlapping in the tread circumferential direction.

Advantageous Effect

According to this disclosure, a pneumatic tire that improves the ride comfort, quietness, and drainage performance while maintaining the steering stability can be provided.

BRIEF DESCRIPTION OF THE DRAWINGS

In the accompanying drawings:
FIG. 1 is a developed view illustrating a tread pattern of the pneumatic tire according to one of the disclosed embodiments.

DETAILED DESCRIPTION

The following describes embodiments of this disclosure in detail with reference to the drawings.

FIG. 1 is a developed view illustrating a tread pattern of the pneumatic tire (also referred to below simply as a tire) according to one of the embodiments of this disclosure, illustrating the tread surface when the tire is mounted on an applicable rim and filled to prescribed internal pressure, with no load.

As illustrated in FIG. 1, the tire according to one of the embodiments of this disclosure has circumferential main grooves 2 extending continuously in the tread circumferential direction formed on the tread surface 1. In the example in FIG. 1, the tire has four circumferential main grooves 21, 22, 23, and 24. In this embodiment, the four circumferential main grooves all have the same shape, and these circumferential main grooves 2 ensure the drainage performance of the tire.

In the example illustrated in FIG. 1, the four circumferential main grooves 2 are provided symmetrically with respect to the tire equatorial plane CL, with two circumferential main grooves 2 in each of the tread width direction halves divided by the tire equatorial plane CL.

Furthermore, as illustrated in FIG. 1, a plurality of land portions 3 are defined by the four circumferential main grooves 2 and tread edges TE1 and TE2. Specifically, an outermost land portion 31 at one side in the tread width direction is defined by the outermost circumferential main groove 21 at one side in the tread width direction and the tread edge TE1 at one side, an intermediate land portion 32 at one side is defined by the outermost circumferential main groove 21 and the circumferential main groove 22 provided adjacent thereto on the other side of the outermost circumferential main groove 21 in the tread width direction, a central land portion 33 positioned on the tire equatorial plane CL in the illustrated example is defined by the circumferential main groove 22 and the circumferential main groove 23 provided adjacent thereto on the other side of the circumferential main groove 22 in the tread width direction, an intermediate land portion 34 at the other side is defined by the circumferential main groove 23 and an outermost circumferential main groove 24 provided adjacent thereto on the other side of the circumferential main groove 23 in the tread width direction, and an outermost land portion 35 at the other side in the tread width direction is defined by the outermost circumferential main groove 24 and the tread edge TE2 at the other side.

In the illustrated example, the outermost land portion 31 and the outermost land portion 35 are formed to have equivalent dimensions in the tread width direction. Also, the intermediate land portion 32, central land portion 33, and intermediate land portion 34 are formed to have equivalent dimensions in the tread width direction.

Lug grooves 41 on the tread edge side are formed in the outermost land portion 31 of this embodiment, with one end opening to the tread edge TE1 and the other end terminating within the outermost land portion 31. Sipes 51 are further formed in the outermost land portion 31 of this embodiment, with the inward end in the tread width direction terminating within the outermost land portion 31. The outer edge, in the tread width direction, of the sipes 51 of this embodiment opens to the tread edge TEL The sipes 51 of this embodiment have a width of 0.7 mm. As referred to here, the width of the sipe is the dimension in a direction perpendicular to the extending direction of the sipe. In this embodiment, the sipes 51 are formed so that the inward end in the tread width direction of the sipes 51 is positioned further outward in the tread width direction than the inward end in the tread width direction of the lug grooves 41 on the tread edge side.

The intermediate land portion 32 on one side in a tread width direction, adjacent to the tire equatorial plane CL side of the outermost circumferential main groove 21 on the one side, is formed into blocks only by sipes 52 extending in the tread width direction. The sipes 52 of this embodiment have a width of 0.7 mm.

The sipes 52 of this embodiment are formed at an inclination relative to the tread width direction. The sipes 52 may, for example, be formed at an inclination of 10° to 50° relative to the tread width direction. By setting the inclination angle of the sipes 52 relative to the tread width direction to be within this range, the steering stability can be maintained even as a large force is applied in the tread circumferential direction and the tread width direction, and the water film in the intermediate land portion 32 can effectively be removed. The sipes 52 of this embodiment are inclined at approximately 30° relative to the tread width direction.

In this embodiment, each block 32a forming the intermediate land portion 32 is formed approximately as a parallelogram with a pair of sides defined by the circumferential main grooves 21 and 22 and extending in the tread circumferential direction, and a pair of sides defined by the sipes 52. In this embodiment, among the corners of each block 32a, corners 32b and 32c with an obtuse angle formed by the sipe 52 and the circumferential main grooves 21 and 22 are chamfered to form chamfered portions 32d and 32e.

As illustrated in FIG. 1, the chamfered portion 32d of this embodiment is formed so that the width dimension in a developed view of the tread surface is the same from the bottom to the tread surface side of the block 32a. The chamfered portion 32e of this embodiment is formed so that the width dimension in a developed view of the tread surface gradually increases from the bottom to the tread surface side of the block 32a.

The central land portion 33 of this embodiment is formed into blocks by sipes 53 extending in the tread width direction. The sipes 53 of this embodiment have a width of 0.7 mm.

The sipes 53 of this embodiment are formed at an inclination relative to the tread width direction. The sipes 53 may, for example, be formed at an inclination of 10° to 50° relative to the tread width direction. By setting the inclination angle of the sipes 53 relative to the tread width direction to be within this range, the steering stability can be maintained even as a large force is applied in the tread circumferential direction and the tread width direction, and the water film in the central land portion 33 can effectively be removed. The sipes 53 of this embodiment are inclined at approximately 30° relative to the tread width direction.

In this embodiment, each block 33a forming the central land portion 33 is formed approximately as a parallelogram with a pair of sides defined by the circumferential main grooves 22 and 23 and extending in the tread circumferential direction, and a pair of sides defined by the sipes 53. In this embodiment, among the corners of each block 33a, corners 33b and 33c with an obtuse angle formed by the sipe 53 and the circumferential main grooves 22 and 23 are chamfered to form chamfered portions 33d and 33e.

As illustrated in FIG. 1, the chamfered portion 33d of this embodiment is formed so that the width dimension in a developed view of the tread surface is the same from the bottom to the tread surface side of the block 33a. The chamfered portion 33e of this embodiment is formed so that the width dimension in a developed view of the tread surface gradually increases from the bottom to the tread surface side of the block 33a.

In this embodiment, as illustrated in FIG. 1, the sipes 53 are formed so that the chamfered portion 33d opposes the chamfered portion 32e of the block 32a forming the intermediate land portion 32. By forming the sipes 53 in this way, good ride comfort can be obtained.

In this embodiment, the blocks 32a of the intermediate land portion 32 and the blocks 33a of the central land portion 33 are formed to have the same shape. In this embodiment, the chamfered portions 32d and 32e are formed in the corners 32b and 32c of the blocks 32a, and the chamfered portions 33d and 33e are formed in the corners 33b and 33c of the blocks 33a. Therefore, the shock is lessened when the corners 32b and 32c and the corners 33b and 33c, which are highly rigid, contact the ground, thus yielding even better ride comfort.

The intermediate land portion 34 on the other side in the tread width direction, adjacent to the tire equatorial plane CL side of the outermost circumferential main groove 24 on the other side, is formed in a ribbed shape. Lug grooves 42 are formed in the intermediate land portion 34, with one end opening into the circumferential main groove 24 and the other end terminating within the intermediate land portion 34.

Sipes 54 are formed in the intermediate land portion 34 of this embodiment, with one end opening into the circumferential main groove 23 adjacent on the equatorial plane side and the other end terminating within the intermediate land portion 34. By providing such sipes 54, the rigidity balance of the intermediate land portion 34 in the tread width direction can be made uniform, and the ride comfort can be further improved while maintaining the quietness.

The sipes 54 of this embodiment are formed at an inclination relative to the tread width direction. The sipes 54 may, for example, be formed at an inclination of 10° to 50° relative to the tread width direction. By setting the inclination angle of the sipes 54 relative to the tread width direction to be within this range, the steering stability can be maintained even as a large force is applied in the tread circumferential direction and the tread width direction, and the water film in the intermediate land portion 34 can effectively be removed. The sipes 54 of this embodiment are inclined at approximately 30° relative to the tread width direction.

In this embodiment, the corner 34a with an obtuse angle formed by the sipe 54 and the circumferential main groove 23 has a chamfered portion 34b formed by chamfering.

As illustrated in FIG. 1, the chamfered portion 34b of this embodiment is formed so that the width dimension in a developed view of the tread surface is the same from the bottom to the tread surface side of the intermediate land portion 34.

As illustrated in FIG. 1, the lug grooves 42 of this embodiment are formed so that the dimension in the tread width direction is smaller than ⅔ of the dimension in the tread width direction of the intermediate land portion 34. Also, the lug grooves 54 of this embodiment are formed so that the dimension in the tread width direction is smaller than ⅔ of the dimension in the tread width direction of the intermediate land portion 34. By forming the lug grooves 42 and the sipes 54 in this way, a reduction in steering stability due to a reduction in the rigidity of the intermediate land portion can be suppressed.

In this embodiment, as illustrated in FIG. 1, the lug grooves 42 and the sipes 54 are formed so as not to overlap in the tread circumferential direction.

Lug grooves 43 on the tread edge side are formed in the outermost land portion 35 of this embodiment, with one end opening to the tread edge TE2 and the other end terminating within the outermost land portion 35. Sipes 55 are further formed in the outermost land portion 35 of this embodiment, with the inward end in the tread width direction terminating within the outermost land portion 35.

The outer edge, in the tread width direction, of the sipes 55 of this embodiment opens to the tread edge TE2. The sipes 55 of this embodiment have a width of 0.7 mm. In this embodiment, the sipes 55 are formed so that the inward end in the tread width direction of the sipes 55 is positioned further outward in the tread width direction than the inward end in the tread width direction of the lug grooves 43 on the tread edge side.

In this embodiment, the extending length of the sipes 51 formed in the outermost land portion 31 is configured to be greater than the extending length of the sipes 55 formed in the outermost land portion 35.

Furthermore, lug grooves 44 on the equatorial plane side are formed in the outermost land portion 35 of this embodiment, with one end opening to the outermost circumferential main groove 24 at a position corresponding to an opening position, to the circumferential main groove 24, of the lug groove 42 formed in the intermediate land portion 34, and the other end terminating within the outermost land portion 35. The lug grooves 44 on the equatorial plane side do not overlap in the tread width direction with the lug grooves 43 on the tread edge side.

In this way, in the tire according to an embodiment of this disclosure, the intermediate land portion 32 on one side in the tread width direction, adjacent to the tire equatorial plane CL side of the outermost circumferential main groove 21 on the one side, is formed into blocks only by sipes 52 extending in the tread width direction; the intermediate land portion 34 on the other side in the tread width direction, adjacent to the tire equatorial plane CL side of the outermost circumferential main groove 24 on the other side, is formed in a ribbed shape; and lug grooves 42 are formed in the intermediate land portion 34 on the other side, with one end opening into the outermost circumferential main groove 24 on the other side, and the other end terminating within the intermediate land portion 34 on the other side.

The following describes the effects of the tire according to this embodiment when mounting the tire onto a vehicle so that the intermediate land portion 34 at the other side is on the outside while the tire is mounted on the vehicle.

In order to improve the steering stability, it is effective to provide the land portions with a ribbed shape, but upon providing all of the land portions with a ribbed shape, the high rigidity of the land portions may prevent sufficient ride comfort, quietness, and drainage performance from being obtained.

By contrast, in the tire according to an embodiment of this disclosure, the intermediate land portion 32 that is on the inside while the tire is mounted on a vehicle is formed into blocks by only the sipes 52, thereby lowering the rigidity of the intermediate land portion 32 and improving the ride comfort and quietness. Since the intermediate land portion 32 is formed into blocks by only the sipes 52, the pattern noise that would occur if the intermediate land portion 32 were formed into blocks by grooves can be prevented, and a reduction in the footprint area can be suppressed while maintaining steering stability.

On the other hand, the intermediate land portion 34 that is on the outside while the tire is mounted on the vehicle is provided with a ribbed shape to satisfy the high rigidity required during cornering. The steering stability is thus maintained, and by providing the lug grooves 42, the drainage performance can also be improved.

Therefore, the pneumatic tire of this embodiment can improve the ride comfort, quietness, and drainage performance while maintaining the steering stability.

In this disclosure, lug grooves 41 and 43 on the tread edge side are preferably formed in the outermost land portions 31 and 35 in the tread width direction defined by the outermost circumferential main grooves 21 and 24 in the tread width direction and by the tread edges TE1 and TE2, with one end of the lug grooves 41 and 43 on the tread edge side opening to the tread edge TE1 or TE2 and the other end terminating within the outermost land portion 31 or 35. By forming such lug grooves 41 and 43, the rigidity of the outermost land portions 31 and 35 can be ensured, while allowing further improvement in the drainage performance. Therefore, the drainage performance can be further improved without reducing the steering stability.

Furthermore, in this disclosure, as described above, sipes 51 and 55 are preferably further formed in the outermost land portions 31 and 35, an inward end in the tread width direction of each sipe terminating within the outermost land portion 31 or 35, and the extending length of the sipe 51 formed in the outermost land portion 31 on the one side is preferably greater than the extending length of the sipe 55 formed in the outermost land portion 35 on the other side. By forming such sipes 51 and 55, the ride comfort and quietness can be further improved, and the rigidity on the outside while the tire is mounted on the vehicle becomes greater than the rigidity on the inside while the tire is mounted on the vehicle, allowing improvement in the steering stability during cornering.

Also in this disclosure, as described above, lug grooves 44 on the equatorial plane side are preferably formed in the outermost land portion 35 on the other side, with one end opening to the circumferential main groove 24 at a position corresponding to an opening position of the intermediate land portion lug groove 42 to the circumferential main groove 24, and the other end terminating within the outermost land portion 35 on the other side, and the lug grooves 44 on the equatorial plane side do not overlap in the tread width direction with the lug grooves 43 on the tread edge side. By adopting this configuration, even if the lug grooves 44 on the equatorial plane side are formed, a reduction in the rigidity of the outermost land portion 35 due to formation of the lug grooves 44 on the equatorial plane side can be suppressed, thereby further improving the drainage performance while maintaining the steering stability.

As another feature of this disclosure, as described above, sipes 54 are preferably formed in the intermediate land portion 34 on the other side, with one end opening into the circumferential main groove 23 adjacent on the equatorial plane CL side and the other end terminating within the intermediate land portion 34 on the other side. By forming such sipes 54, the rigidity of the intermediate land portion 34 in the tread width direction can be made uniform, thereby further improving the ride comfort while maintaining the quietness. It is also possible to suppress a reduction in the quietness and ride comfort occurring when forming grooves on the inside while the tire is mounted on the vehicle, which tends to yield high ground contact pressure during regular running.

As yet another feature of this disclosure, as described above, four circumferential main grooves 2 are preferably formed on the tread surface, and the tire preferably further includes a central land portion 33 extending across the tire equatorial plane CL between the intermediate land portion 32 on the one side and the intermediate land portion 34 on the other side, the central land portion 33 being formed into blocks by sipes 53 extending in the tread width direction. By adopting this configuration, the occurrence of pattern noise in the central land portion 33 can be suppressed, and a reduction in the footprint area can be suppressed, thereby maintaining the quietness and steering stability.

As still another feature of this disclosure, as described above, the sipes 52 in the intermediate land portion 32 on the one side are preferably formed at an inclination relative to the tread width direction, and among corners of each block 32a in the intermediate land portion 32 on the one side, corners 32b and 32c with an obtuse angle formed by the sipes 52 and the circumferential main grooves 21 and 22 are preferably chamfered. Inclining the sipes 52 ensures the rigidity necessary during cornering. Also, by chamfering, the rigidity of the corners 32b and 32c with an obtuse angle formed by the sipes 52 and the circumferential main grooves 21 and 22 can be reduced, thereby reducing the shock when the corners 32b and 32c contact the road surface and improving the ride comfort.

Embodiments of this disclosure have been described, but this disclosure is in no way limited to the above embodiments. For example, the number of circumferential main grooves formed on the tread surface may be three or may be five or more. A variety of other changes and modifications may be made.

INDUSTRIAL APPLICABILITY

According to this disclosure, a pneumatic tire that improves the ride comfort, quietness, and drainage performance while maintaining the steering stability can be provided.

REFERENCE SIGNS LIST

1 Tread surface
2 Circumferential main groove
21 Outermost circumferential main groove
22, 23 Circumferential main groove
24 Outermost circumferential main groove
3 Land portion
31 Outermost land portion
32 Intermediate land portion
32a Block
32b, 32c Corner
32d, 32e Chamfered portion
33 Central land portion
33a Block
33b, 33c Corner
33d, 33e Chamfered portion
34 Intermediate land portion
34a Corner
34b Chamfered portion
35 Outermost land portion
41 Lug groove on tread edge side
42 Lug groove
43 Lug groove on tread edge side
44 Lug groove on equatorial plane side
51, 52, 53, 54, 55 Sipe
CL Tire equatorial plane
TE, TE1, TE2 Tread edge

The invention claimed is:

1. A pneumatic tire comprising:
a tread surface;
the tread surface having an inner side and an outer side wherein, in a tread width direction, the inner side of the tread surface is positioned towards a lateral center of a vehicle when the pneumatic tire is mounted to the vehicle and the outer side of the tread surface is positioned towards a lateral outside of the vehicle when the pneumatic tire is mounted to the vehicle;
a plurality of circumferential main grooves extending continuously in the tread surface in a tread circumferential direction;
a plurality of land portions defined by the circumferential main grooves;
an inner side intermediate land portion on the inner side of the tread surface, the inner side intermediate land portion formed into blocks only by inner side intermediate sipes extending in the tread width direction and wherein the inner side intermediate land portion is between an innermost circumferential main groove on the tread surface and a tire equatorial plane;
an outer side intermediate land portion on the outer side of the tread surface formed in a ribbed shape, wherein in the ribbed shape the outer side intermediate land portion is not divided into blocks in the tread circumferential direction by lug grooves or sipes;
a central land portion extending across the tire equatorial plane, the central land portion positioned between the inner side intermediate land portion and the outer side intermediate land portion;
outer side intermediate lug grooves formed in the outer side intermediate land portion, with outer ends of the outer side intermediate lug grooves opening into an outermost circumferential main groove and inner ends of the outer side intermediate lug grooves terminating within the outer side intermediate land portion; and
outer side intermediate sipes formed on an inner side of the outer side intermediate land portion, with inner side ends of the outer side intermediate sipes opening into an outer side intermediate circumferential main groove, the outer side intermediate circumferential main groove positioned on an outer side of the tire equatorial plane, and wherein
outer side ends of the outer side intermediate sipes terminate within the outer side intermediate land portion,
the outer side intermediate sipes and the outer side intermediate lug grooves are alternately disposed in the tire circumferential direction,
the outer side intermediate sipes are the only sipes in the outer side intermediate land portion,
the central land portion is formed into blocks by central sipes wherein the central sipes extend in the tread width direction on extended lines of the inner side intermediate sipes.

2. The pneumatic tire of claim 1, further comprising:
a tread surface inner edge, the tread surface inner edge positioned towards the lateral center of the vehicle when the pneumatic tire is mounted to the vehicle;
innermost lug grooves formed in an innermost land portion, the innermost land portion being defined by the innermost circumferential main groove and the tread surface inner edge, wherein inner ends of the innermost lug grooves open to the tread surface inner edge and outer ends of the innermost lug grooves terminate within the innermost land portion.

3. The pneumatic tire of claim 2, further comprising:
innermost sipes formed in the innermost land portion, outer side ends of the innermost sipes terminating within the innermost land portion;
outermost sipes formed in an outermost land portion, inner side ends of the outermost sipes terminating within the outermost land portion; and
wherein a length of the innermost sipes is longer than a length of the outermost sipes.

4. The pneumatic tire of claim 2, further comprising:
outermost land portion inner side lug grooves formed in the outermost land portion, with inner side ends of the outermost land portion inner side lug grooves opening to the outermost circumferential main groove, and outer side ends of the outermost land portion inner side lug grooves terminating within the outermost land portion;
outermost land portion outer side lug grooves formed in the outermost land portion, and
wherein the outermost land portion inner side lug grooves do not overlap in the tread width direction the outermost land portion outer side lug grooves.

5. The pneumatic tire of claim 1, further comprising:
four circumferential main grooves formed in the tread surface.

6. The pneumatic tire of claim 1,
wherein the inner side intermediate sipes are formed in the inner side intermediate land portion at an inclination relative to the tread width direction; and
wherein among corners of each block in the inner side intermediate land portion, corners with an obtuse angle formed by the the inner side intermediate sipes and the circumferential main grooves are chamfered.

7. The pneumatic tire of claim 6,
wherein among the corners of each block in the inner side intermediate land portion, corners with an acute angle formed by the inner side intermediate sipes and the circumferential main grooves are not chamfered.

8. A tire-rim assembly comprising the pneumatic tire of claim 1 and a rim, wherein the inner side of the tread surface of the pneumatic tire is positioned at one side of the rim to be faced to a vehicle when the tire-rim assembly is mounted to the vehicle and the outer side of the tread surface of the pneumatic tire is positioned at the other side of the rim to be faced to a curb when the tire-rim assembly is mounted to the vehicle.

* * * * *